United States Patent [19]

Morgan

[11] 4,165,955
[45] Aug. 28, 1979

[54] APPARATUS FOR MAKING FLAT TOP BUNS

[75] Inventor: Charles W. Morgan, Rolling Hills, Calif.

[73] Assignee: United Foam Corporation, Compton, Calif.

[21] Appl. No.: 868,848

[22] Filed: Jan. 12, 1978

Related U.S. Application Data

[63] Continuation-in-part of Ser. No. 736,142, Oct. 27, 1976, Pat. No. 4,069,285.

[51] Int. Cl.² .............................................. B29D 27/04
[52] U.S. Cl. .............................. 425/89; 264/DIG. 84; 425/224; 425/329; 425/817 C
[58] Field of Search .................... 264/45.8, 46.2, 51, 264/54, 216, 165, 316, DIG. 84; 425/4 C, 115, 224, 329, 89, 371, 817 C

[56] References Cited

U.S. PATENT DOCUMENTS

| | | | |
|---|---|---|---|
| 3,726,623 | 4/1973 | Ferstenberg | 425/817 C X |
| 3,768,937 | 10/1973 | Haga et al. | 425/4 C |

Primary Examiner—Mark Rosenbaum
Attorney, Agent, or Firm—Blakely, Sokoloff, Taylor & Zafman

[57] ABSTRACT

A method and apparatus for making flat topped foamed buns (e.g. polyurethane) in a continuous foaming process. In accordance with the method, continuous thin film tubular members are guided onto each side of the central trough defining conveyor of a continuous pouring system, and a central trough defining film member generally covering the central conveyor is guided thereover prior to the dispensing head. The edges of the tubular members are subsequently guided upward over guides at each side of the trough so that the tubular define upward sloping side walls traveling at an angle and rate determined in accordance with the rate of longitudinal travel and the rate of rise of the foaming reactants so as to encourage the sides of the bun to the same height of rise as the center region of the bun. Continuous slitting of the tubular members at an appropriate elevation allows the material thereof to progress longitudinally with the cured bun.

23 Claims, 14 Drawing Figures

APPARATUS FOR MAKING FLAT TOP BUNS

CROSS REFERENCES TO RELATED APPLICATIONS

This application is a continuation-in-part application of my copending application entitled "Apparatus For Making Flat Top Foam Buns", filed Oct. 27, 1976, as Ser. No. 736,142 now U.S. Pat. No. 4,069,285.

BACKGROUND OF THE INVENTION

1. Field of the Invention

The present invention relates to the field of continuous foaming methods and apparatus, and more particularly to methods and apparatus for achieving flat top buns in a continuous, open top foaming process.

2. Prior Art

Flexible polyurethane foam is widely used for cushioning and sound absorption in a great number of commercial and consumer applications. By way of example seat cushions, mattresses and crash-padding commonly utilize flexible urethane foam with an appropriate functional and decorative covering thereover of cloth, vinyl or other materials. While urethane foam may be and is molded in some form of closed mold for some applications, it is common to foam the constituents in an open mold in a continuous process to form large buns, which are then sliced into sheets or blocks of the desired size. The equipment used in such processes comprises a long conveyor system onto which is disposed a disposable material such as a polyethylene or paper film, supported by a bottom conveyor and side conveyors (or fixed sides with a moveable film), to define a generally U-shaped trough for constraining the bottom and side surfaces of the foam. The foam reactants are mixed and dispensed at one end of the trough, which quickly foam as they progress through the machine to form a long continuous bun existing from the opposite end thereof.

Without more, the apparatus hereinbefore described results in a bun similar in cross section to a loaf of bread, characterized by a rounded top surface having a much greater height at the center thereof than at the sides. Such a bun shape is highly undesirable, as the slicing of the bun into rectangular sheets or blocks results in substantial waste caused by the curvature of the top surface. Accordingly various methods and apparatus have been devised which tend to provide a much flatter top surface of the bun without constraining the free rise of the foam.

It is well known that the rounded top surface of a freely rising bun is caused primarily by viscous effects between the rising foam material and the sidewalls defining the trough within which foaming is occurring. Accordingly, various techniques and apparatus have been devised for at least temporarily defining sidewalls effectively rising with the foam to negate the viscous effects adjacent the sidewall, and to encourage the free rise of the sides of the bun to the same extent as is encountered at the center of the bun. While a perfectly flat top bun may not be achieved, the irregularity (curvature) of the top surface of the bun may be grossly reduced by this technique, thereby minimizing resulting waste in the subsequent slicing of the bun.

The prior art relating to processes for making flat top buns is quite extensive, as the economic incentive for achieving the desired result has been long standing and great. Of the large volume of prior art, however, certain selected prior art patents are believed most relevant both because of their specific apparatus, and for some of them because of their known commercial use.

In U.S. Pat. No. 3,091,811, apparatus and methods for molding a foam material in continuous open top molding processes are disclosed. In one embodiment, crepe paper is formed into a U-shaped channel at each side of the molding conveyor and guided first substantially longitudinally to the vicinity of the cream line, and then upward at a predetermined angle in accordance with the rise and linear progression of the reactants. When the foam has nearly reached its full height, the strips of crepe paper continue upward and are drawn out of the conveying trough. In another embodiment, large discs supported on a common horizontal shaft are disposed at each side of the trough adjacent the cream line and caused to rotate, thereby defining an upward component at the sides of the trough during foaming. It will be noted in both of these embodiments that the item or material defining the upward component of velocity during foaming is contemplated as being removed from the trough as the foaming mass approaches its full rise, which would require a very heavy material to allow its being pulled away from the foam mass, and which normally would cause considerable scarring of the sides of the bun, thereby achieving the desired flat top characteristic at the expense of substantial waste at the sides of the bun. This patent, however, does disclose the basic concept of defining upward progressing sidewalls in the foaming region to achieve the desired result, though until now, the problem has remained as to how to achieve the result on a production basis in a simple, low-cost and highly reliable manner.

In Japanese Patent No. 41-17667, rolls of suitable sheet material are disposed at each side of the trough, with material dispensed from the rolls, being directed first horizontally and then upward along the desired trajectory along the conveyor. The horizontal component of the trajectory is defined, or more appropriately maintained, by toothed wheels adjacent the foam line rotating about substantially vertical axes and firmly engaging the material so as to limit its direction up to that point. Thereafter the material proceeds upward along a trajectory defined by a pair of rollers encouraging the material upward and on out of the foaming trough. The system contemplates a rather narrow strip of material being used at each side of the trough, which strip, as already mentioned, continues upward to be separated from the bun adjacent the region of near maximum rise thereof.

U.S. Pat. Nos. 3,719,734 and 3,751,197 disclose methods and apparatus to achieve flat top buns in a continuous process by the guiding of relatively wide plastic sheets longitudinally to the cream line, then upward in accordance with the foaming rate for release at a point adjacent the region of full expansion of the reactants. The system utilizes, adjacent each side wall, a continuous chain having a plurality of individual grippers to grip the plastic sheets adjacent the top thereof and to define the upward directed trajectory, resulting in a relatively mechanically complex system and requiring relatively thick plastic sheets or films so as to respond to the grippers without stretching or tearing.

U.S. Pat. Nos. 3,809,512 and 3,812,227 also disclose methods and apparatus for continuous molding of flat top buns utilizing plastic sheets of relatively wide material having an upward trajectory in the foaming region. This system utilizes a fold-bar at the bottom of the trough somewhat downstream of the foam line over which a downward proceeding plastic film is directed so as to redirect the sheet along the desired upward trajectory defined by the pinch rollers engaging the top edge of the film adjacent the point of maximum foam rise. While the system appears relatively simple, control of the foldbar and the mechanism assuring proper rise of the plastic sheet along the trajectory are critical, and a relatively strong plastic sheet is required because of the local mechanical stresses created by the rollers defining the upward trajectory. In practice, tape reinforcement of the film edge is required. In this regard it should be noted that any system which does not gently but positively define the trajectory of the plastic sheet along the full length of the foaming region, but only defines that trajectory by rollers or other devices at the end points thereof, will necessarily require a much stronger plastic sheet because of the tension and concentration of stresses therein at the local points of support. Also, since the fold bar projects well beyond the cream line, scarring of the resulting bun may be caused thereby.

U.S. Pat. Nos. 3,768,937 and 3,875,276 disclose a method and apparatus for achieving the desired result using continuous tubular shaped plastic films at each side of the trough. The films are directed in a downward and forward trajectory off of rolls, with a guide plate inserted into each tubular member during the downward portion of the trajectory to maintain the basic tubular shape. The guide plates are folded about a horizontal line in the region of the cream line so as to define the desired upward directed trajectory starting approximately at the cream line. A cross section of each guide plate in the region of the fold is an approximate U-shape, with another plate extending downward between the legs of the U-shape to assure the desired contour and motion of the tubular member in that region. The tubular members proceed along the desired upward directed trajectory (defined by the guide plates) through the foaming region, with friction being minimized by plastic coatings on the guide plates and by the injection of air along the "leading edge" thereof. The tubular members are slit adjacent the region of maximum rise so as to freely proceed longitudinally with the cured bun outward through the machine. Adjustments are provided for the longitudinal position of the guide plates, though other parameters of the system appear to be nonadjustable. While this system has been used commerically, the friction encountered in the region of the fold of each guide plate generally requires the use of a relatively thick plastic film for the tubular members, and then the mechanical complexity and lack of adjustment therein prevents "fine tuning" of the system to achieve optimum results under varying conditions. Furthermore, the thickness of the assembly in the region of the foam line and for some distance thereafter, and perhaps other reasons, causes considerable scarring on the sides of the bun, thereby creating an additional source of waste.

BRIEF SUMMARY OF THE INVENTION

A method and apparatus for making flat topped foamed buns (e.g. polyurethane) in a continuous foaming process. In accordance with the method, continuous thin film tubular members are guided onto each side of the central trough defining conveyor of a continuous pouring system, and a central trough defining film member generally covering the central conveyor is guided thereover prior to the dispensing head. The edges of the tubular members are subsequently guided upward over guides at each side of the troth so that the tubular members define upward sloping side walls traveling at an angle and rate determined in accordance with the rate of longitudinal travel and the rate of rise of the foaming reactants so as to encourage the sides of the bun to the same height of rise as the center region of the bun. Continuous slitting of the tubular members at an appropriate elevation allows the material thereof to progress longitudinally with the cured bun.

The disposition of the thin film tubular members generally under the sides of the central film member allows the convenient disposition of the central film member and the two tubular members in rolls at the forward end of the conveyor system, with the axis of the rolls being generally horizontally disposed. The initial tubular member path under the central film member is well defined, probably in part by the weight of the reactants thereon in the pouring zone, with the guidebars precisely defining the subsequent trajectory of the tubular members to provide the desired upward motion. Because of the well defined trajectory of the tubular members and the absence of any substantial folds in the surfaces thereof in the foaming region, a flat top bun having an absolute minimum of scarring on the sides thereof is achieved. As in my copending application, adjustability in the vertical and horizontal positions of the guidebars, in the angle of the guidebars, and in the position of the slitting knives along the guidebars provides sufficient adjustability to ensure optimum results.

DETAILED DESCRIPTION OF THE INVENTION

In my copending application I described a method and apparatus for making flat top foamed buns (e.g. polyurethane) in a continuous foaming process utilizing continuous thin film tubular members at each side of the pouring trough. The method comprised the guiding of continuous film tubular members through eye-like gathering devices substantially adjacent the area of the cream line at each side of the conveyor, and subsequently guiding the tubular members upward along a guidebar at an angle and rate determined in accordance with the rate of longitudinal travel and the rate of rise of the foaming reactants so as to encourage the sides of the bun to the same height of rise as the center region of the bun. Continuous slitting of the tubular members at the appropriate elevation allowed the material thereof to progress longitudinally with the cured bun.

The use of simple eye-like guides or other equivalent gathering means substantially adjacent the cream line, together with the simple guidebars defining the subsequent trajectory of the tubular members were found in practice to provide the desired result in a relatively trouble free manner in comparison to the prior art, utilizing inexpensive thin film materials and resulting in a minimum of scarring at the sides of the cured bun. Adjustability in the vertical and horizontal positions of the gathering members and the guidebars, in the angle of the guidebars, and in the position of the slitting knives along the guidebars provided sufficient adjustability to ensure optimum results.

When the apparatus of my copending application is properly installed and adjusted, high quality flat top buns with a relative minimum of scarring on the sides thereof were achieved. However, it was found that with respect to certain parameters, special care had to be taken so that frequently new installations of that apparatus required special set up and care in operation to assure the end result. In particular, since the gathering means of that apparatus was disposed in the main trough generally adjacent the cream line, care had to be taken to avoid contact between the gathering means and the foaming reactants to avoid the buildup of foam residue on the gathering means. For this reason and perhaps for other reasons, occasional binding of the tubular members with the gathering means would occur in some installations, detracting from the results thereby achieved.

Thus, the purpose the present invention is to preserve those aspects of the apparatus of my earlier application which performed in the positive manner and were not subject to significant variations from installation to installation, and at the same time to improve the apparatus and method so as to eliminate the guide means and all other structure in the vicinity of or subject to possible direct contact with the reactants, so as to eliminate any possibility of the accummulation of residue on any structure which could effect the operation of the apparatus. The result of the invention is a particularly simple and fool-proof method and apparatus which provides the desired result with even greater repeatability than in my earlier apparatus and method, which is particularly simple to build and practice, and which may be easily adapted to various installations and equipment.

Figure 1:
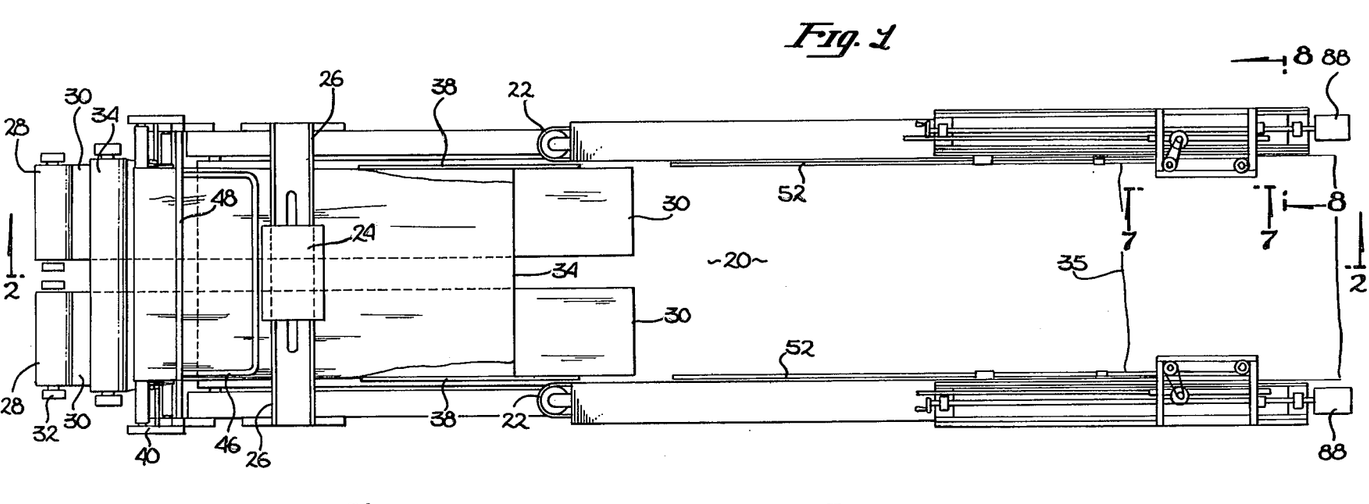
FIG. 1 is a top view of a typical continuous pouring machine incorporating the present invention.
Figure 2:
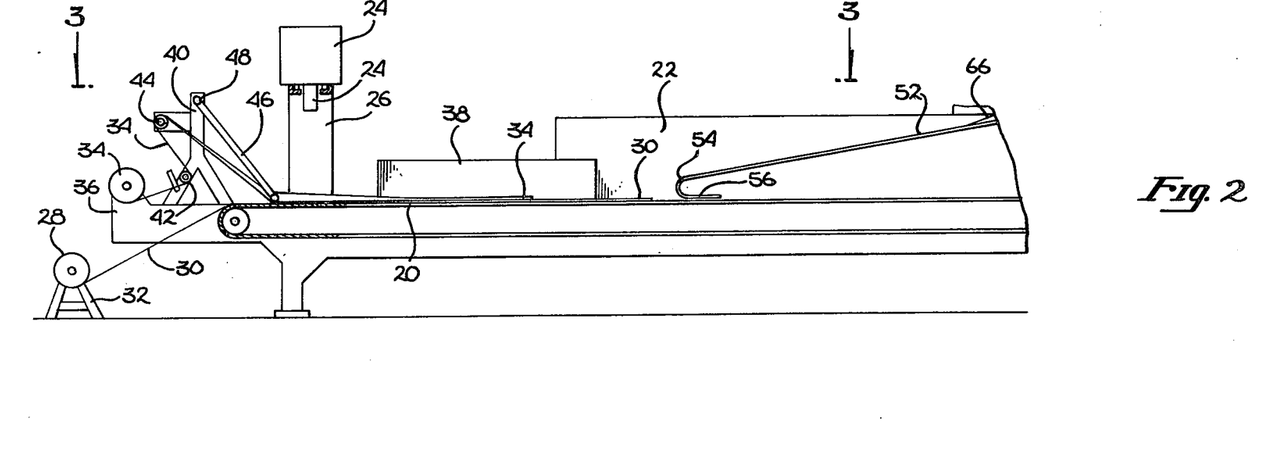
FIG. 2 is a side cross-sectional view of the machine of FIG. 1.

Now referring to FIGS. 1 and 2, a top view and a side view respectively, of the forward portion of a typical pouring machine for the open and continuous molding of polyurethane foams with the present invention mounted thereon may be seen. The pouring machine has a main or central substantially horizontal or slightly inclined conveyor 20 and a pair of side conveyors 22 for defining a U-shaped trough through the machine. Adjacent one end of the horizontal or bottom conveyor 20 and mounted thereabove is a pouring head 24 supported by a support structure 26 so as to oscillate back and forth across the width of the conveyor 20 to uniformly dispense the mixture of the foaming reactants onto the conveyor.

Disposed forward of the forward or starting end of the conveyor system are two rolls 28 of tubular polyethylene film 30, the rolls 28 being supported by supports 32 with their axes substantially horizontal so that the tubular members 30 will directly roll out onto the central conveyor 20. In addition, a third roll 32 of polyethylene film 34 is also disposed forward of the starting end of the conveyor system and generally above the tubular film members 30 so that the film 34 may roll out onto the central conveyor over the tubular members 30. The roll 32 in the preferred embodiment is supported by an extension 36 of the frame of the conveyor system, with the film 34 thereon being slightly wider than the central conveyor 20 so that the film 34, when passing between side guides 38 and the side conveyors 22, may form a shallow U-shaped trough.

It has been found when practicing the present invention that it is desirable to provide some tension in the film 34 for better control thereof. For that purpose an additional support structure 40 is provided for supporting a pair of rollers 42 and 44 for defining a somewhat circuitous path for the film 34 to provide some tension therein. In addition, a U-shaped bar 46 is supported on a pivoted horizontal bar 48 so that the weight of the U-shaped bar 46 rests on the film 34 to further help guide the film smoothly and uniformly onto the central conveyor 20. Preferably the central film member is wider than the trough defined by the conveyor system by at least twice the depth of the liquid foam reactants to be dispensed therein so that the edges of the central film member may be turned upward and supported by the side conveyors to define a shallow, fluid tight trough. This is aided by the bar 46, which also forms a forward dam.

In the preferred manner of practicing the present invention, the tubular members 30 have a width somewhat less than one-half the width of the central conveyor 20, and are preferably rolled out on the central conveyor with the outer edges of the two tubular members generally aligned with or even somewhat outside the plane of the guides 38 and the side conveyors 22. The width of the tubular members shown is generally convenient for the general proportions of the pouring machine shown, though it is to be understood that wider and/or narrow tubular members can be readily used as desired or convenient for the particular pouring machine on which the present invention is practiced. In that regard, it is not even essential that the tubular members 30 be separated as they lay out on the central conveyor (see FIG. 1), as overlapping of the two tubular members could be achieved if desired (as illustrated by tubular members 30a in FIG. 14) by the staggering of the longitudinal positions of the two rolls 28, shown for purposes of illustration of the preferred method as being coaxial.

Figures 3, 12, 13, 14:
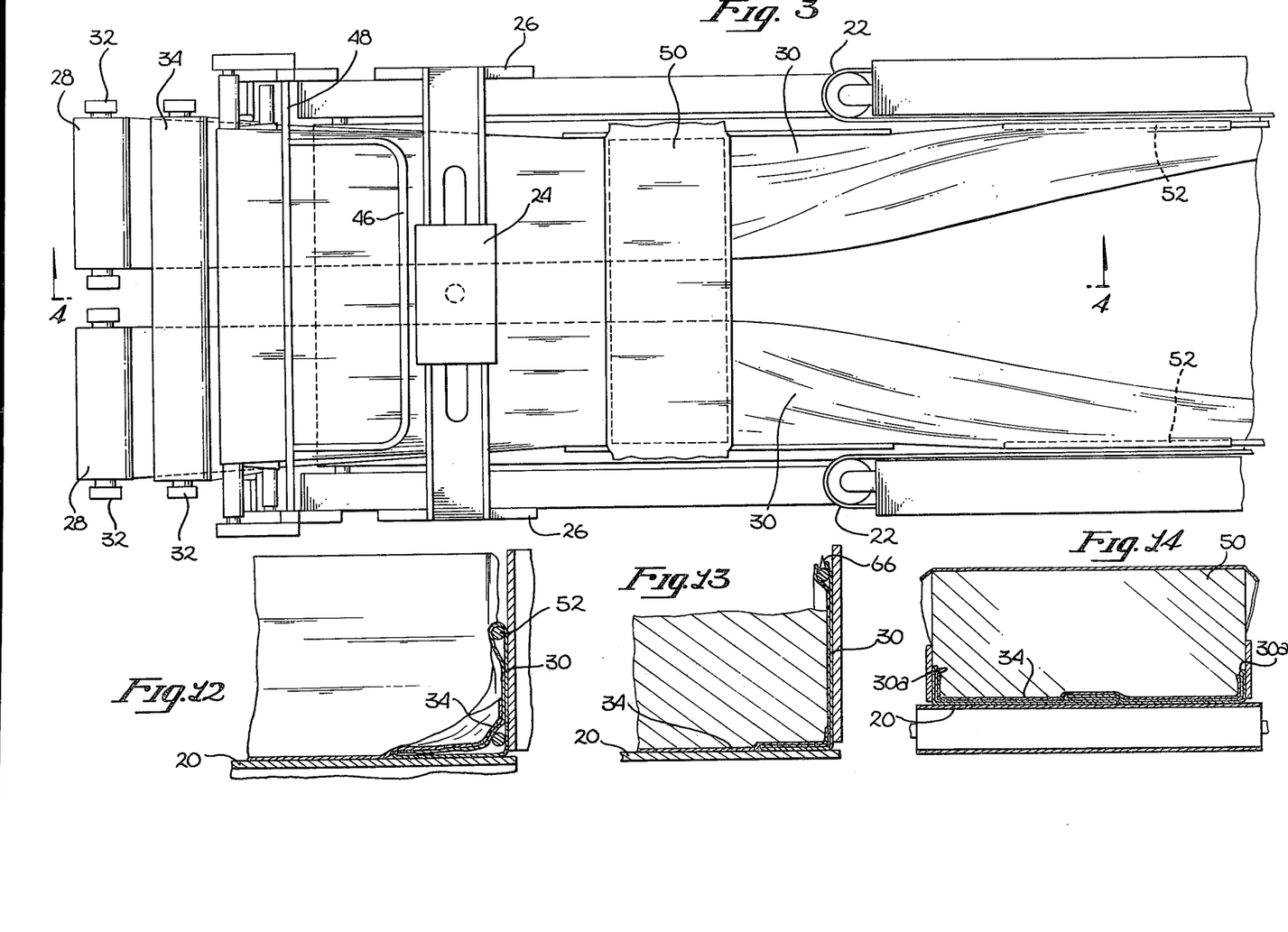
FIG. 3 is a top view taken on an expanded scale of a portion of the machine of FIG. 1.
FIGS. 12 and 13 are partial cross-sectional views of the guidebars and conveyor system illustrating the extraction and slitting of the tubular film members.
FIG. 14 is a cross-sectional view illustrating an alternate disposition of the tubular members as laid out on the central conveyor.
Figure 4:
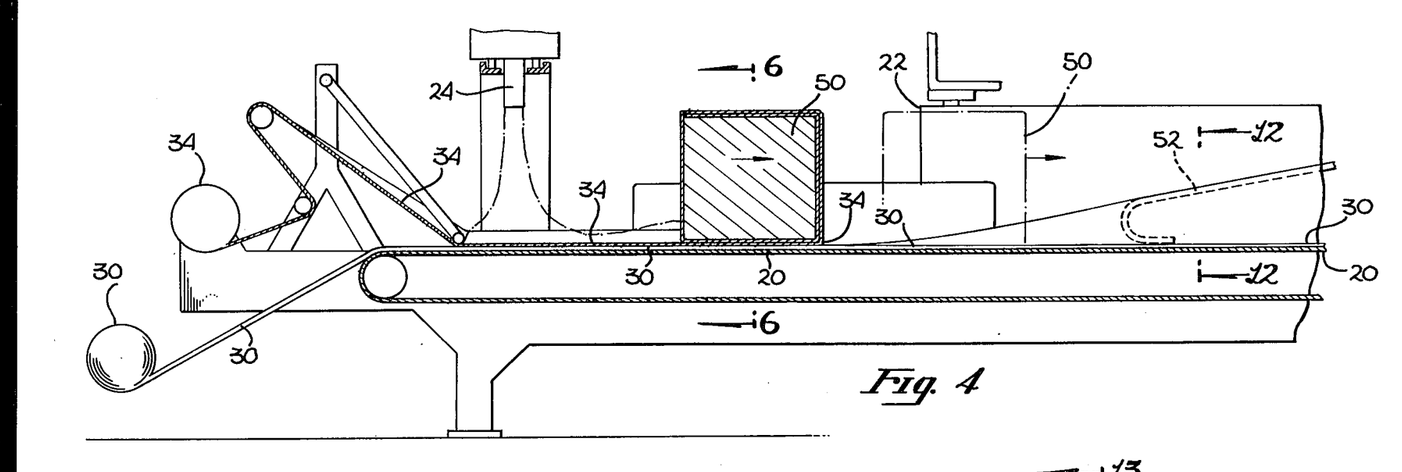
FIG. 4 is a side view taken on an expanded scale of a portion of the machine of FIG. 1.

FIGS. 1 and 2 illustrate the general arrangement and disposition of the three rolls of polyethylene film, two of which are preferably tubular members or at least members having a tubular position, and the third of which (the central film member) is preferably a single film thickness. These figures further illustrate the general lay out of the tubular members 30 and the central film member 34 onto the central conveyor, the starting ends of the tubular members and the central film member being shown therein. FIGS. 3 and 4 illustrate on an expanded scale the next step preparatory to the pouring of the polyurethane foam reactants. In this step a block 50 of a previously poured urethane bun is trimmed to size to form a dam in the conveyor system, and is wrapped with the central film member 34 and taped in position so that the leading edge or end of the film 34 terminates in the dam thereby formed. Also, the tubular members 30 are pulled forward and over guidebars 52 which guidebars serve the same function as disclosed in the copending application. In particular, each guidebar extends downward to the approximate vicinity of the cream line, having a hook-like region 54 at the lower end thereof so as to define a streamlined "leading edge" for smooth penetration into the outer edge region of the respective tubular member, with a lower portion 56 extending to a position adjacent and parallel to the lower conveyor 20. The preferred guidebars 52 are generally tubular bars, and may be provided with small openings along the leading edge thereof through which air may be directed, thereby providing a tendency of blowing the tubular members toward an open condition. It has been found however, that the use of air is not required to avoid binding in this region, though may be desirable not only as an extra safeguard, but also because of its tendency to reduce the static electricity build-up which may be encountered with thin polyethylene films. In any event, the guidebars 52 in the preferred embodiment are teflon coated to provide a self-lubricating tendency. While the preferred guidebars 52, as discussed above, are hollow tubular bars which provide a light weight, easily adjustable members, solid guidebars may be used, as well as guide bars having other than circular cross sections, e.g., rectangular, elliptical, etc.

Figure 9:
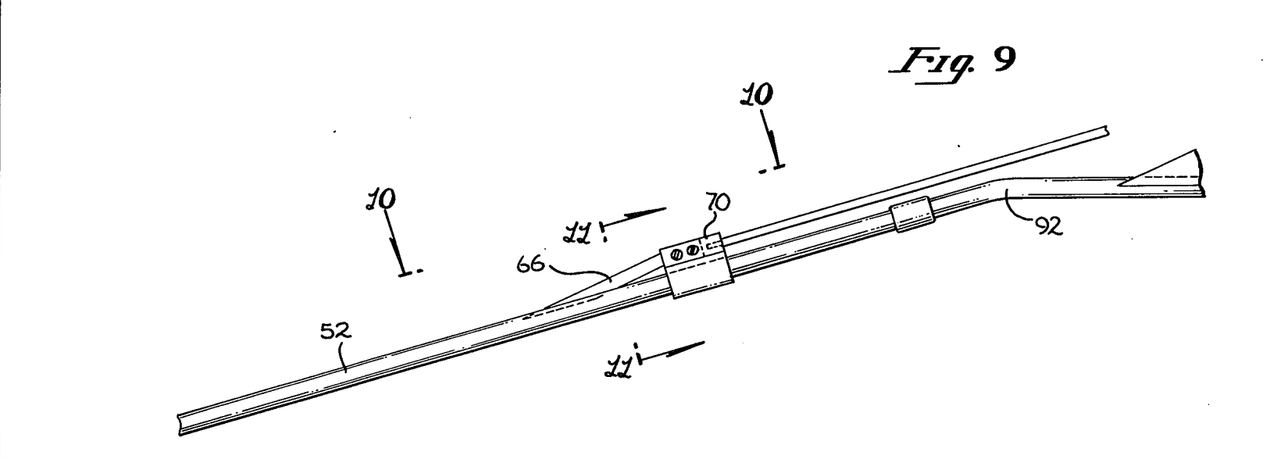
FIGS. 9 through 11 are views illustrating the structure adjustment in operation of the slitting knives.
Figure 10:
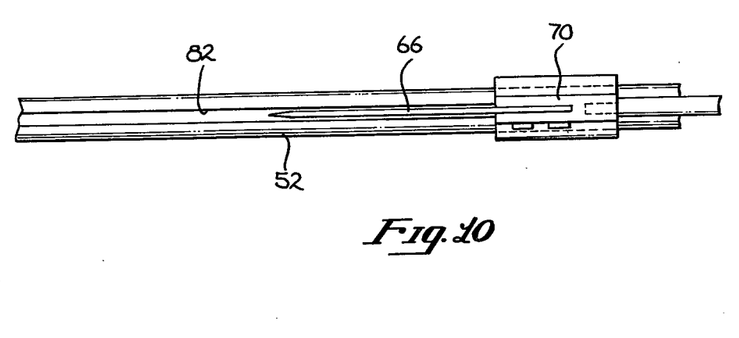
Figure 11:
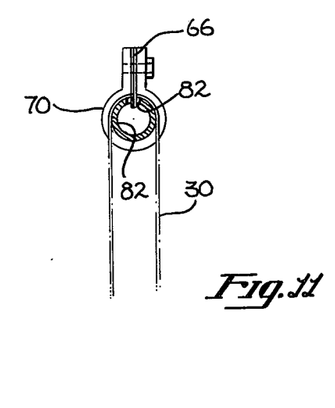

Each guidebar 52 is adjustably inclined at an angle approximating the resultant of the velocity of the reactants through the foaming machine and the rate of rise thereof, or more appropriately, at an angle which in practice results in the optimum flat top bun. Adjacent the upper portion of each of the guidebars 52 is a knife blade 66 supported by a collar 70 and guided by an appropriately disposed slot in the guidebar for continuously slitting the tubular member in this region to allow it to progress longitudinally outward with the bun. As may be best seen in FIGS. 9, 10 and 11, the collar 70 slides on the guidebar 52 with the blade 66 sliding therewith within a slot 82 in the guidebar to provide adjustability in the position of the knife blades, generally within the vicinity of the region of maximum rise 35 (see FIG. 1). As a result of this specific structure, in comparison to that of U.S. Pats. No. 3,809,512 and 3,812,227, no substantial side disturbance (e.g., in a lateral direction) is caused in the region of foaming. This, together with the accurately controllable release of the tubular members by adjustment of the knife blades, results in a minimum of scarring or streaking of the side of the buns in comparison to the prior art apparatus and methods.

Figure 7:
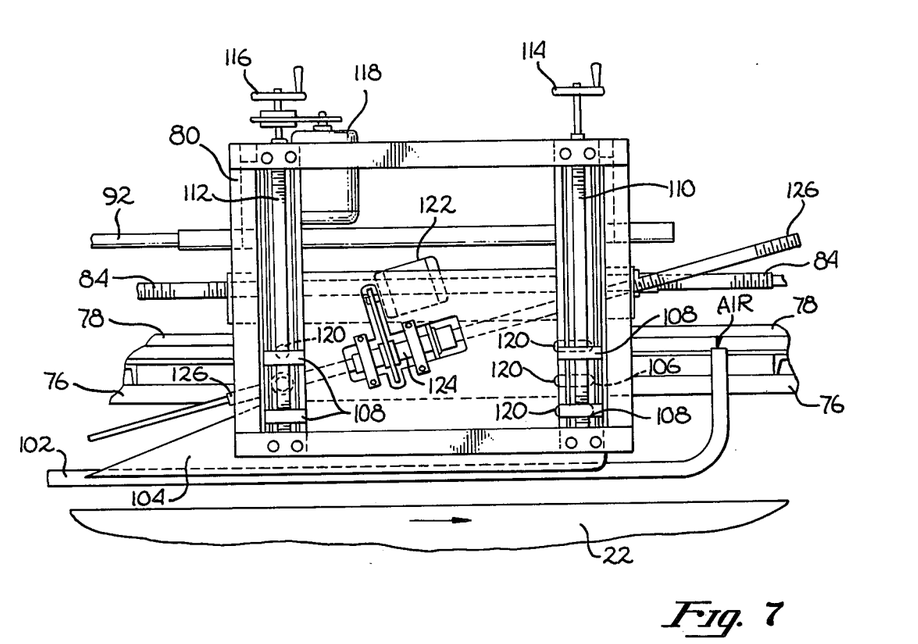
FIG. 7 is a side view of the guidebar adjustment mechanism of the machine of FIG. 1.
Figure 8:
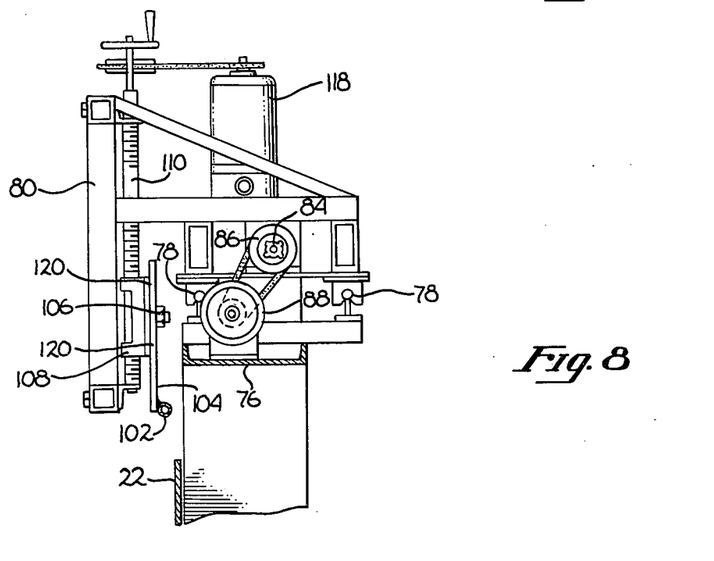
FIG. 8 is a longitudinal cross-section of the guidebar adjustment mechanism of the machine of FIG. 1.

Now referring to FIG. 8, a cross section taken along line 8-8 of FIG. 2 may be seen. Mounted to a frame member 76 at each side of the pouring machine are a pair of parallel spaced apart rails 78, with a carriage assembly 80 having open ball bushings thereunder engaging the rails for longitudinal motion parallel to and at the side of the trough. The longitudinal position of each carriage assembly is determined by a lead screw 84 (see FIGS. 1 and 7) supported on bearings 86 coupled to the frame of the pouring machine, and a lead screw follower coupled to the carriage assembly itself. The lead screw 84 in the preferred embodiment is driven by motor 88 (FIG. 2) to allow remote adjustment in the longitudinal position of the carriage, though a hand wheel 90 is also provided for manual adjustment if desired.

As may be seen in FIG. 7, the upper end 102 of the guidebar 52 is fastened to a vertically disposed support plate 104 (see also FIG. 8), which in turn is bolted by bolts 106 to lead screw followers 108. The carriage assembly 80 supports a pair of lead screws 110 and 112, having hand wheel drives 114 and 116 and a motor drive 118. The lead screws 110 and 112 are vertically disposed and spaced apart in a fore and aft relationship so that rotation of both in unison raises and lowers the guidebar 52 as desired, with differential rotation of the lead screws providing adjustment in the angle of inclination of the guidebar 52. (In the preferred embodiment, multiple bolt holes 120 provide a selection of nominal positions for the guidebar around which the adjustability is provided.) Also mounted on the plate 104 is a motor 122 driving a lead screw follower 124 engaging a lead screw assembly 126 coupled to the collar 70 and knife blade 66. This provides a remote control for the relative position of the slitting knives along each of the guidebars 52 for adjustment in accordance with the maximum rise of the reactants. The net result is that adjustability is provided for all important parameters determining the proper positioning of the side plastic film sheet material forward of the foam line, the position at which the film is initially withdrawn along its upward trajectory, the angle of the upward trajectory and the point at which the upward trajectory is terminated adjacent the region of maximum rise of the foaming mass. The tubular members 38 have been generally referred to as being preferably made of polyethylene. However, it should be clearly understood that any nonrigid and easily foldable tubular or looped member can be used, such as polypropylene, paper, fabric, etc.

It has been found that for optimum results in obtaining flat top polyurethane buns the tubular members 30 should be slit at the position of about 80% to 90% of the maximum rise of the reactants. The position of slitting the members 30 directly effects the shape and profile of the sides of the buns and therefore, should be adjusted as required.

While the preferred embodiment utilizes a full tubular member, tubular members comprised of a generally loop shaped or tubular shaped section adjacent to the upper portion thereof with a single downward directed sheet or film region integrally coupled thereto may also be used. The tubular region need only be as large as required to at least loosely fit over the guidebars 52, with the sheet region extending as appropriate to give the overall height desired. Of course, if desired, the lower regions 54 and 56 of the guidebars 52 may be reconfigured to allow for a smaller tubular region, though in practice it has been found that the full tubular member 30, together with the guidebars as shown, is most easily procured and presents no difficulties in use.

Figure 5:
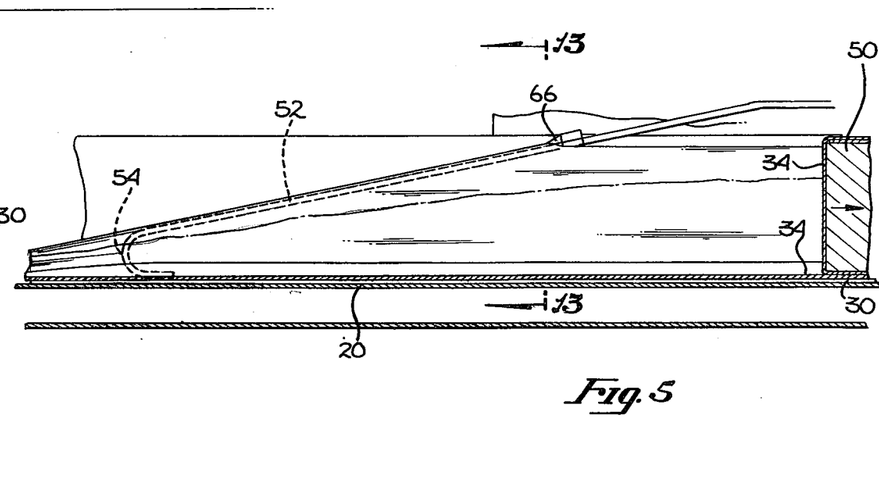
FIG. 5 is a side cross-sectional view of a portion of the machine of FIG. 1 taken on an expanded scale illustrating the operation thereof.
Figure 6:
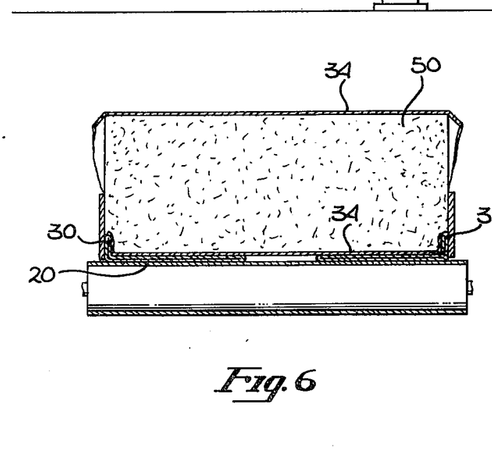
FIG. 6 is a cross-sectional view taken along line 6—6 of FIG. 4.

As previously mentioned, it is preferred to use a central film member 34 which is somewhat wider than the central conveyor (i.e., the separation of the two side conveyors) and to lay down the tubular members 30 so that the outer edges thereof also extend to a position adjacent but outside the plane of the respective side conveyor. This allows the turning up of the edges of the central film member as best illustrated in FIG. 6 to confine the liquid foam reactants as they are dispensed by the dispensing head 24 (see FIG. 4) and also allows the feeding of the tubular members 30 onto the lower end 54 of the guidebars 52 prior to the forceable and gradual withdrawl of the tubular members from under the central film member as they progress along the upward path defined by the guidebars 52. Of course, once the conveyor system is turned on and pouring begins, the tubular film members are manually guided along the guidebars 52 until the block 50 has proceeded past the slitting knives 66 (see FIG. 5) whereafter the tubular members and the central film member are regularly and automatically laid out on the central converyor as a result of the driving force on the portion thereof extending into the region of the cured bun. Thus, because of the simplicity of the disposition of the tubular members and the central film member by simply rolling out the respective members onto the central conveyor and the absence of any critical structure in the region of the cream line which might come in contact with the foaming reactants, there is substantially no opportunity for binding and tearing the film members or for any substantial stretching thereof. As the bun proceeds along the conveyor, the tubular film members proceed over the guidebars 52 (see FIGS. 12 and 13) with the tubular film members 30 being withdrawn at the appropriate rate by the slope of the guide members 52 to define upward traveling sidewalls above the upper edge of the central film member 34. It is preferable that the tubular film members 30 have a width which, when the upper edge thereof reaches a slitting knife 66, the lower edge thereof will still underlie the outer (upper) edge of the central film member 34 and, if desired, may even extend to a portion of the central conveyor 20 as shown in FIG. 13.

There has been described herein a method and apparatus for making flat top foamed buns which are particularly simple in practice and readily applied to existing pouring equipment to provide highly repeatable results. In the preferred embodiment, the apparatus for providing the central film member is coupled to the frame of the conveyor system itself, though the supports for the rolls of the tubular film members are self-standing so as to be readily positioned as desired (even staggered to allow the overlapping of the inner edges of the tubular members on the central conveyor, if desired). Obviously, these rolls may be supported from the frame of the conveyor system at any appropriate elevation or, for that matter, all three rolls may be appropriately located on self-supporting structures. Thus, while the preferred method and apparatus has been disclosed and described in detail herein, it will be understood by those skilled in the art that various changes in form and detail may be made therein without departing from the spirit and scope of the invention.

I claim:

1. In apparatus for molding products in continuous open molding equipment having a bottom conveyor and a pair of side conveyors, each side conveyor being disposed adjacent the bottom conveyor to define an open top trough for lining with one or more film members onto which foam reactants are dispensed to react in a foaming region to form a continuous bun in the trough defined by the moving conveyor system, the improvement comprising:

first supply means for supplying first and second tubular film members, each having at least a tubular portion, onto said bottom conveyor at a position prior to the region said foam reactants are dispensed and with the outer edge of said tubular portion of each said tubular film member generally parallel to and adjacent the plane of a respective side conveyor;

second supply means for supplying a third film member having a width at least equal to a substantial fraction of the width of said bottom conveyor onto said bottom conveyor at a position prior to the region said foam reactants are dispensed and over said first and second tubular film members;

guide means adjacent each of said side conveyors, each of said guide means being a means for extending into a respective one of said tubular members and for guiding the top thereof along an upwardly inclined trajectory adjacent said foaming region; and means for opening each of said tubular members adjacent the end of said foaming region to allow separation of said tubular members from said guide means.

2. The apparatus of claim 1 wherein said first supply means comprises means for supplying said tubular film members from supply rolls of tubular film members having a substantially horizontal axis.

3. The apparatus of claim 1 wherein said first supply means is a means for supplying first and second tubular film members each having a width exceeding the height of rise of said foaming reactants in said foaming region.

4. The apparatus of claim 1 wherein said first supply means is a means for supplying said first and second tubular film members onto said bottom conveyors so that the inner edge region of one of said tubular members overlies the inner edge region of the other of said tubular members.

5. The apparatus of claim 1 wherein said first supply means is a means for supplying said first and second tubular film members onto said bottom conveyor so that the inner edges of said tubular members are spaced apart.

6. The apparatus of claim 1 wherein said first supply means is a means for supplying said first and second tubular film members onto said bottom conveyor with the outer edges of said tubular portions of said tubular film members having a separation exceeding the separation of said side conveyors.

7. The apparatus of claim 6 wherein said second supply means is a means for supplying a third film member having a width exceeding the separation of said side conveyors.

8. The apparatus of claim 6 wherein said second supply means is a means for supplying a third film member having a width exceeding the separation of said side conveyors by an amount exceeding twice the depth of the liquid foam reactants to be dispensed thereon.

9. The apparatus of claim 1 wherein said second supply means is a means for supplying a third film member having a width exceeding the separation of said side conveyors by an amount exceeding twice the depth of the liquid foam reactants to be dispensed thereon.

10. The apparatus of claim 1 wherein said means for opening each of said tubular members adjacent the end of said foaming region comprises a knife blade coupled to each of said guide means, each of said knife blades being adjustable in position along the respective guide means.

11. The apparatus of claim 1 further comprised of means for adjusting said guide means for changing the angle of said upwardly inclined trajectory defined thereby.

12. The apparatus of claim 1 wherein the elevation of said guide means and the position of said guide means along the path of travel of said conveyor system are each adjustable.

13. The apparatus of claim 1 further comprised of means for adjusting said guide means for changing the angle of said upwardly inclined trajectory defined thereby, and means for adjusting the elevation of said guide means and the position of said guide means along the path of travel of said conveyor system, said means for opening each of said tubular members adjacent the end of said foaming region being a knife blade coupled to each of said guide means, each of said knife blades being adjustable in position along the respective said guide means.

14. In apparatus for obtaining molded products in continuous open molding equipment having a conveyor system defining an open top trough having a bottom and oppositely disposed sides in which is disposed at least one film member to cover the bottom and at least part of the side walls defining the trough, onto which foam reactants are dispensed to react in a foaming region to form a continuous bun as the film member proceeds along the conveyor system, the improvement comprising:

first supply means for supplying first and second tubular film members into the bottom of said conveyor system at a position prior to the region said foam reactants are dispensed and with the outer edge of each said tubular film member generally parallel to and adjacent the plane of a respective side of said trough;

second supply means for supplying a third film member having a width exceeding the width of said trough onto the bottom of said trough at a position prior to the region said foam reactants are dispensed and over said first and second tubular film members;

a guide member adjacent each side of said conveyor system, each of said guide members being disposed for extending into a respective one of said tubular members and for guiding the top thereof along an upwardly inclined trajectory adjacent said foaming region; and slitting knives for opening the upper region of each of said tubular members adjacent the end of said foaming region to allow separation of said tubular members from said guide members.

15. The apparatus of claim 14 wherein said first supply means is a means for supplying first and second tubular film members each having a width exceeding the height of rise of said foaming reactants in said foaming region.

16. The apparatus of claim 14 wherein said first supply means is a means for supplying said first and second tubular film members onto said bottom conveyor so that the inner edge region of one of said tubular members overlies the inner edge region of the other of said tubular members.

17. The apparatus of claim 14 wherein said first supply means is a means for supplying said first and second tubular film members onto said bottom conveyor so that the inner edges of said tubular members are spaced apart.

18. The apparatus of claim 14 wherein said first supply means is a means for supplying said first and second tubular members onto the bottom of said trough with the outer edges of said tubular portions of said tubular film members having a separation exceeding the separation of said side conveyors.

19. The apparatus of claim 14 wherein second supply means is a means for supplying a third film member having a width exceeding the separation of said side conveyors by an amount exceeding twice the depth of the liquid foam reactants to be dispensed thereon and substantially less than twice the height of rise of the foamed reactants.

20. The apparatus of claim 14 wherein said means for opening each of said tubular members adjacent the end of said foaming region comprises a knife blade coupled to each of said guide means, each of said knife blades being adjustable in position along the respective guide means.

21. The apparatus of claim 14 further comprised of means for adjusting said guide means for changing the angle of said upwardly inclined trajectory defined thereby.

22. The apparatus of claim 14 wherein the elevation of said guide means and the position of said guide means along the path of travel of said conveyor system are each adjustable.

23. The apparatus of claim 14 further comprised of means for adjusting said guide means for changing the angle of said upwardly inclined trajectory defined thereby, and means for adjusting the elevation of said guide means and the position of said guide means along the path of travel of said conveyor system, said means for opening each of said tubular members adjacent the end of said foaming region being a knife blade coupled to each of said guide means, each of said knife blades being adjustable in position along the respective said guide means.

* * * * *